United States Patent Office 3,135,599
Patented June 2, 1964

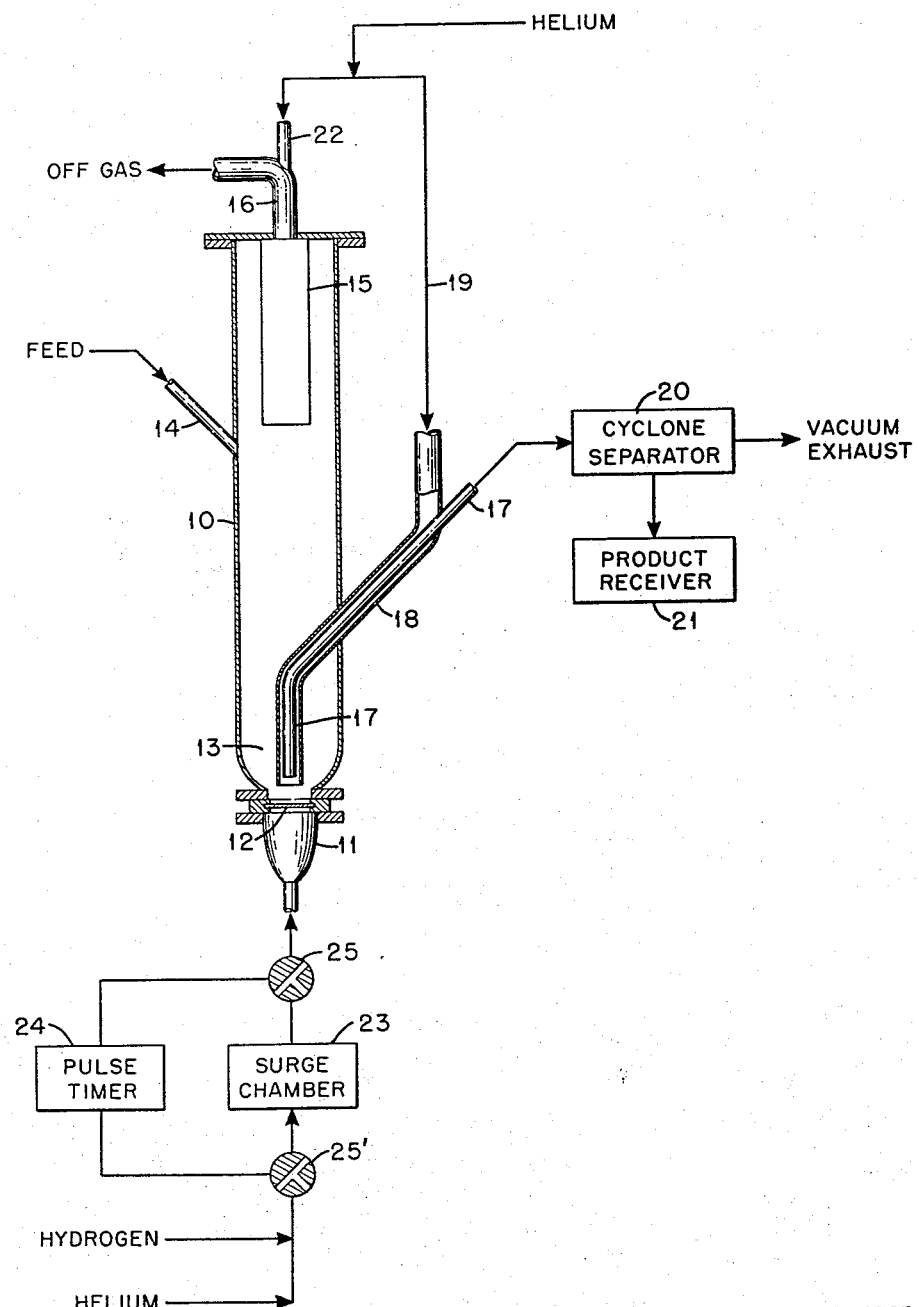

3,135,599
PRODUCTION OF URANIUM METAL POWDER IN A PULSED FLUIDIZED BED AND POWDER RESULTING THEREFROM
Henry M. Heidt, Powell, Tenn., assignor to the United States of America as represented by the United States Atomic Energy Commission
Filed June 8, 1962, Ser. No. 201,221
7 Claims. (Cl. 75—84.1)

The present invention relates to an improved method of producing uranium metal powder and the improved powder resulting therefrom. More particularly, it relates to an improved method of producing uranium metal powder having a discrete range of particle size.

Uranium metal powder which is to be used for forming parts by powder metallurgical techniques should have certain requisite properties. The powder should be free from any impurities, including those incidental to its mode of manufacture, having a high surface area, but low particle size and have a high surface energy while yet being free of any adverse gaseous sorbed impurities. For use in powder compaction techniques, the metal powder particles should have a spherical or substantially spherical shape. For maximum efficiency of blending, and in order to insure the formation of a powdered compact having a minimum void volume, the metal powder mixture should consist of particle sizes ranging from as high as 100 microns down to as small as less than 1 micron in size. More importantly, its mode of manufacture should permit the reproduction of uniform lots and identical grades of powder which meets the requirements set out above.

Due to its high malleability, ductility and affinity for oxygen, the conversion of massive uranium to finely divided powder by conventional mechanical means is extremely difficult.

There are two main methods for making uranium metal powder. A widely used method involves the reduction of uranium dioxide with metals or carbon. The resultant uranium powder must be extensively washed to remove impurities. Unfortunately, during the washing operation, the uranium fines, which are desirable for the purposes outlined, are washed away with the other impurities leaving a uranium metal powder whose minimum particle size does not extend below about 100 microns.

One of the more successful methods of producing uranium powder which has at least some of the requisite properties is by conversion of massive uranium to uranium hydride followed by decomposition of the hydride wherein the sequence of operations proceed according to the following reactions:

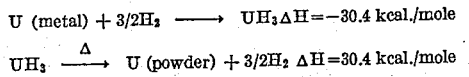

The theoretical considerations which govern these reactions are well known and may be found in such standard references as Katz and Rabinowitch, The Chemistry of Uranium, Part 1, NNES, Div. VIII, vol. 5, pp. 183 et seq. Uranium metal reacts with hydrogen at temperatures as low as about 100–150° C. with the reaction proceeding at a optimum rate of approximately 250° C. The uranium hydride powder produced by this reaction is fluffy in character and has a particle size of about 100 microns with a density of approximately 10.9 grams/cc. Decomposition of the hydride results in the formation of a highly pyrophoric uranium powder product having a theoretical density of about 18.7 grams/cc.

Decompositon of massive uranium hydride proceeds at a temperature in the approximate range 225–550° C. with no apparent difficulty. However, it has been found that, because of the high surface activity of the resultant uranium metal powder particles, the powder particles tend to form sintered agglomerates. These sintered agglomerates must be subsequently crushed and comminuted into a desired particle size suitable for use in forming uranium metal parts by compaction and/or by powder metallurgical techniques. Thus, mechanical comminution of the sintered aggregates merely results in the formation of sintered uranium particles of lesser size but whose surface activity and sinterability has now been reduced considerably. Moreover, the additional handling, transfer, grinding and screening operations increase the cost of the finally desirable powdered product, and introduce small but deleterious amounts of contamination. The contamination may be in the form of absorbed or sorbed gaseous impurities or may result from the introduction of metallic impurities by contact of the uranium metal powder with the various handling, transfer and grinding apparatus.

With these difficulties in mind, it is a general object of this invention to provide an improved process for producing uranium metal powder.

Another object of this invention is to provide an improved and inexpensive process for the production of uranium metal powder by decomposition of uranium hydride in a pulsed fluidized bed.

A further object of this invention is to provide a process for producing a sinterable uranium metal powder of high purity.

A further object of this invention is to provide a process by which uranium hydride may be decomposed without deleterious agglomeration and/or sintering of the resultant uranium metal powder particles.

A still further object of this invention is to provide a process producing a compactable, sinterable, powder metallurgical grade of uranium powder.

The objects of this invention are accomplished by conducting the decomposition of uranium hydride in a pulsed fluidized bed reactor. By utilizing a pulsed, fluidized bed, adverse agglomeration and sintering of the resultant powder are effectively eliminated. The product particle size and distribution can be reproduced and controlled within discrete limits, as desired, to an extent heretofore unobtainable. Instead of the necessity of resorting to separate mechanical comminution procedures to produce the desired powder product, the process of this invention prevents agglomeration of the uranium hydride by utilizing a pulsed fluidized bed to reduce the powder to a desired particle size. Discrete control of the powder particle size under an inert atmosphere reduces the possibility of gaseous and/or solid contamination of the resultant powder product. Thus, in a single apparatus a turbulent mass of uranium hydride is decomposed under an inert atmosphere under conditions which avoid agglomeration and/or sintering to produce a highly sinterable uranium metal powder whose average particle size can be discretely controlled by maintaining the resultant powder in the pulsed fluidized bed for a period of time depending upon the size of the product desired to be achieved. The general method, to be described more fully hereinafter, is further uniquely characterized by the fact that a highly purified and sinterable uranium powder having an average particle diameter of about 0.5 micron with 95% of the particles running less than 1 micron can be consistently reproduced.

The invention will be more fully understood from the following description considered in connection with the drawing which is a view, in section, of a fluidized bed reactor together with a flow sheet for the process of producing uranium metal powder.

Referring to the figure, the fluid bed reactor for carrying out the hydriding and decompositon reactions comprises a fluid bed reactor housing 10, a fluidizing gas inlet 11, a gas distributor plate 12, a reaction chamber 13, a reactor feed loader 14, and off gas filter 15 and outlet 16 with an inert gas filter flow back 22. The reactor housing 10 should be of a metal construction to withstand the operating temperatures and chemically reactive conditions. The porous gas distribution plate 12 which also serves as a bed support may be made of Inconel stainless steel or similar metal. The reaction chamber 13 should be of sufficient size to contain the expanded bed volume developed when uranium is formed. In the example, a reaction chamber 5 inches in diameter and 36 inches high was used and found sufficient to process a 25–30 pound feed load of metallic uranium. The reactor feed loader 14 is designed to admit massive uranium metal in the form of machining chips, turnings, or similar size metal, and should possess means to effect an air-tight closure when the reactor is in operation.

In order to keep the uranium powder contamination to a minimum the fluid bed reactor is provided with an enclosed powder transfer system. As shown in the figure, this system comprises a powder transfer tube 17, a concentric transfer diluent tube 18 which extends slightly beyond the end of tube 17, an inert gas source, such as helium, for a transfer diluent stream 19, a cyclone separator 20, which receives the pneumatically transferred powder and then discharges it into a product receiver 21; a source of vacuum which, when energized, will effect pneumatic transfer of the uranium powder from the reactor to the cyclone separator through powder transfer tube 17.

The fluid bed reactor is provided with a system for feeding, controlling and pulsating the fluidizing medium. The fluidizing medium may comprise an inert gas, such as helium or argon, or a mixture of any one of these with hydrogen. In addition to functioning as a fluidizing medium the inert gas provides an inert atmosphere (when hydrogen is absent) throughout the apparatus while hydrogen has the dual function in that it is a reagent for the hydriding reaction while also acting as a fluidizing medium. The gas feed and control system comprises a source of an inert gas and hydrogen, a surge chamber 23, a pulse timer 24, and valves 25, 25' with associated piping. The surge chamber should have a capacity of approximately one-fourth of volume of the reaction chamber. To maintain the desired fluidizing medium in the reaction chamber, selected volumes of inert gas and/or hydrogen under a chosen pressure are admitted to the surge chamber, the gas sources valved off, and the pressurized gas admitted to the fluid bed. Repeated admission and release of the fluidizing gas from the surge chamber to the fluid bed, according to a selected time cycle, creates a pulsating effect within the fluid bed reaction chamber. This pulsation can be adjusted to provide agitation of the powder without channeling or expelling the powder from the reactor into the off-gas filter. The pulsing rate and the relative flows of inert gas and hydrogen must be varied as a production run progresses through the reaction cycle to accommodate for the marked change in density as the hydride is decomposed to uranium powder.

Since all gas streams entering the fluid bed reactor are potential sources of powder product contamination, hot titanium chip beds for the removal of oxygen and a $CaSO_4$ bed for the removal of water, for example, should be supplied to the various gas headers to minimize contamination from such sources.

The process will now be discussed with somewhat more detail in connection with (1) feed preparation, (2) hydriding reaction, (3) thermal decomposition reaction, and (4) powder transfer.

The feed material for the preparation of uranium metal powder is preferably massive uranium metal in the form of machining chips and turnings, drillings or other metallic uranium sources. The metal is sized by passing through a jaw crusher to break the metal into chips with the approximate dimensions of ⅛" x ¾" x 1". The sized chips are then degreased, pickled in dilute nitric acid, washed first with water and finally with acetone or ethyl alcohol. About 25 pounds of the washed chips are manually loaded into the described reactor through the reactor feed loader, after which the reactor is sealed. Wet-loading prevents surface oxidation of the chips during the brief period of exposure to the atmosphere. A small continuous flow of inert gas, preferably helium or argon should be maintained in the reactor at all times between production cycles to provide an inert atmosphere therein.

After charging the reactor, the linear velocity of inert gas is adjusted to a rate of between 2 and 2½ feet per second (f.s.) and the reactor heated from room temperature to approximately 220° C. as rapidly as possible. While heating means are not shown, it may comprise a clam-shell furnace or a high frequency induction coil surrounding the area of fluidization of the reactor. Upon reaching a reaction chamber temperature of approximately 220° C. hydrogen flow is commenced. As the hydrogen contacts the uranium metal, the exothermic hydriding reaction occurs. By controlling the flow of hydrogen into the reactor, the rate of reaction can be maintained within the preferred approximate range of from 220° C. to 275° C. At the outset, because of the high density of the uranium chips, fluidization will not occur. With a 25-pound charge, in the apparatus described, about 2½ hours are required to accumulate sufficient $UH_3$ for fluidization, at which time pulsation at the rate of about 30 to 40 cycles/min. is commenced while creating a differential pressure across the surge chamber of between 15 to 20 p.s.i.g. These conditions will be sufficient to effect fluidization of the $UH_3$. As previously described, the pulsation rate and pressure should be sufficient to maintain fluidity of the bed without channeling or expelling material from the reaction chamber. The required pulse rate is maintained at least until the hydriding reaction is complete which requires approximately 3 hours in the case of a 25-pound charge of massive uranium.

Since decomposition of $UH_3$ is an endothermic reaction, heat is applied to the reactor. Before initiating decomposition of the hydride, a major part of the hydrogen flow is replaced by helium flow. By reducing the pulse rate to about 25 cycles/min. while increasing the differential pressure across the surge chamber to between 28 to 32 p.s.i.g. and regulating the inert gas/$H_2$ volume ratio to between 0.8 and 0.95 of the total gas flow while supplying heat to the reactor, the $UH_3$ is decomposed in a controllable manner to form a dispersed, fluidized, mass, uranium metal powder with no harmful caking or sintering. The reduction in pulse rate and simultaneous increase in differential pressure across the surge chamber is necessary to maintain bed fluidity and provide maximum dispersion as the lighter density $UH_3$ decomposes to form the heavier uranium powder. By controlling the hydrogen composition of the fluidizing gas to no more than about 20% of the total gas flow through the reactor, sufficient hydrogen will be present to facilitate control of the decomposition reaction rate at which neither adverse sintering or caking of the uranium powder occurs.

After reaching a bed temperature of between about 420° C. to about 455° C. the partial hydrogen flow is completely replaced with helium. The temperature is then increased until a temperature of approximately 535° C. is reached. This temperature is maintained for a time sufficient to insure completion of the decomposition reaction (normally about 10 min.). Temperatures above 550° C. and the absence of at least a small amount of hydrogen in the fluidized atmosphere should be avoided, since caking and/or sintering of the uranium powder is likely to occur even with the well-dispersed pulsed fluidized bed.

When the decomposition reaction is complete, helium flow and pulsing are continued while the reactor, now containing a fluidized bed of the uranium metal powder, is allowed to cool until the bed temperature reaches approximately 95° C. The fluidized powder is allowed to settle on plate 12. Helium or other inert gas is then flowed through diluent stream line 19 and the vacuum exhaust means is energized. This will cause portions of the powder to be entrained and swept out of the reactor through transfer line 17 into cyclone separator 20. This pneumatic transfer is maintained until all of the powder has been removed from the reactor.

*Example*

Using the apparatus previously described a number of 25-pound batches of uranium were converted to a powder metallurgical grade powder as follows: with helium gas flowing through the fluid bed reactor, a 25-pound charge of washed uranium chips was loaded into the reactor. The helium flow was adjusted to 2 c.f.m. after which the reactor was heated to reaction temperature (220° C.) in ½ hour, to initiate hydride formation. At the end of the 2½ hours, the helium flow was terminated; the pulsation rate was set at 32 cycles/min., surge chamber pressure at 15 p.s.i.g., and the reaction temperature maintained by control of the hydrogen flow through the reactor. At the end of about 3 hours, the uranium metal was converted to uranium hydride powder.

The uranium hydride thus formed was then decomposed in the pulsed fluidized bed to uranium metal powder by heating the reactor while increasing the helium flow and reducing the hydrogen flow until the hydrogen comprised about ⅓ of the total flow. To accommodate the increase in the density of the fluid bed as uranium powder begins to form it was necessary to reduce the pulse rate to 25 cycles/min. and increase the pressure across the surge chamber to 30 p.s.i.g. At about 425° C. the partial hydrogen flow was completely replaced by helium and the temperature increased to about 540° C. and this temperature maintained for at least 10 minutes. The decomposition reaction was completed in 3 hours. The uranium powder product was cooled for 2 hours to a bed temperature of 95° C. Helium flow with pulsing was continued throughout the cooling cycle. After cooling, fluidization was terminated, and the vacuum means energized to pneumatically transfer the powder to the cyclone separator and thence to the product receiver. The powdered uranium product was found to consist of substantially spherical particles having an average particle diameter of 0.5 micron with 95% having a diameter no greater than about 1 micron.

While the preferred embodiment of the process has been described in connection with using massive uranium metal, it should be understood that the starting material may comprise uranium hydride powder produced at another source. The only stipulation is, however, that the uranium hydride powder must not be agglomerated and/or sintered, but rather be in the form of discrete particles having a maximum diameter particle size somewhat greater than the desired particle size.

Having thus described my invention, what I claim is:

1. In a process for producing uranium metal powder wherein uranium metal is converted to uranium hydride and subsequently decomposed to form uranium metal powder, the improvement which comprises maintaining said uranium hydride in a dispersed state in a fluidized zone containing said hydride in a fluidizing medium comprising a major proportion of an inert gas and a minor proportion of hydrogen, gradually heating said hydride in said zone to a temperature of from about 420° C. to no greater than 550° C., periodically pulsing said fluidizing medium and gradually reducing the hydrogen content from a maximum of 20% of the total gas flow through said zone to a minimum of no less than about 0.5% of said total flow until the uranium hydride has been decomposed to a uranium metal powder product.

2. The improvement of claim 1 wherein the inert gas is selected from the group consisting of argon and helium.

3. In a process for producing uranium metal powder of powder metallurgical grade wherein uranium metal is converted to uranium hydride and subsequently decomposed to form uranium metal powder, the improvement which comprises maintaining said uranium hydride in a dispersed state in a fluidized zone containing said hydride in a fluidizing medium comprising a major proportion of an inert gas and a minor proportion of hydrogen, gradually heating said hydride in said zone to a temperature of from about 420° C. to about 550° C., periodically pulsing said fluidizing medium and gradually reducing the hydrogen content thereof until the uranium hydride has been decomposed to a metal powder product having an average particle size of less than 1 micron and thereafter separating said product.

4. A process for producing uranium metal powder from uranium hydride which comprises maintaining said uranium hydride in a dispersed state in a reaction zone containing said hydride in a fluidizing medium comprising an inert gas and hydrogen, gradually heating said hydride in said reaction zone to a temperature of about 550° C., periodically pulsing said fluidizing medium and gradually reducing the hydrogen content thereof until the uranium hydride has been decomposed to a uranium metal powder product and thereafter separating said product.

5. The process according to claim 4 wherein the hydrogen content of the fluidizing medium during decomposition of said hydride comprises no more than about 20% by volume.

6. The process of claim 5 wherein the inert gas of the fluidizing medium is selected from the group consisting of argon and helium.

7. A powdered uranium product consisting of substantially spherical particles in which at least 95% of said particles have a maximum diameter no greater than about 1 micron, said product being produced by the reduction of particles of uranium hydride within a fluidized zone maintained at a temperature in the range 420–550° C. in which the fluidizing medium in said zone consists of a mixture of an inert gas and hydrogen, and in which said fluidizing medium is periodically pulsed during the course of hydride decomposition and wherein the inert gas to hydrogen flow ratio varies from 0.8 to 0.95 as said decomposition proceeds to completion.

References Cited in the file of this patent
UNITED STATES PATENTS

| | | |
|---|---|---|
| 2,750,681 | Berry | June 19, 1956 |
| 2,784,054 | Carter et al. | Mar. 5, 1957 |
| 2,813,351 | Godel | Nov. 19, 1957 |
| 2,856,273 | Beber et al. | Oct. 14, 1958 |
| 2,912,320 | Chang | Nov. 10, 1959 |
| 2,915,362 | Fried et al. | Dec. 1, 1959 |
| 2,917,382 | Feder et al. | Dec. 15, 1959 |
| 2,947,620 | Whitehouse et al. | Aug. 2, 1960 |

OTHER REFERENCES

Metal Progress, December 1955, pp. 77 and 78.